United States Patent [15] 3,645,365
Domek [45] Feb. 29, 1972

[54] ADJUSTABLE SHOCK ABSORBER

[72] Inventor: John A. Domek, Lombard, Ill.

[73] Assignee: Efdyn Corporation, Chicago, Ill.

[22] Filed: Feb. 26, 1970

[21] Appl. No.: 14,285

[52] U.S. Cl............................................188/285, 188/287
[51] Int. Cl.................................................F16f 9/44
[58] Field of Search...............188/287, 285, 298, 314, 315, 188/318, 297

[56] References Cited

UNITED STATES PATENTS

| | | | |
|---|---|---|---|
| 3,176,972 | 4/1965 | Deschner | 188/287 X |
| 3,307,842 | 3/1967 | Ellis, Jr. | 188/287 X |
| 3,491,993 | 1/1970 | Scholin et al. | 188/285 X |
| 3,478,846 | 11/1969 | Germond | 188/287 X |

*Primary Examiner*—George E. A. Halvosa
*Attorney*—Edward F. Jurow and Clifford A. Dean

[57] ABSTRACT

A hydraulic shock absorber including a casing having fluid passageway means, a pressure tube within the casing and having metering ports of various sizes in the wall thereof, and a piston slidable in the pressure tube. The pressure tube is rotatable whereby different ones of the metering ports may be selectively aligned with the fluid passageway means for adjusting the flow of fluid from the pressure tube to the fluid passageway means upon application of impact forces to the piston.

5 Claims, 8 Drawing Figures

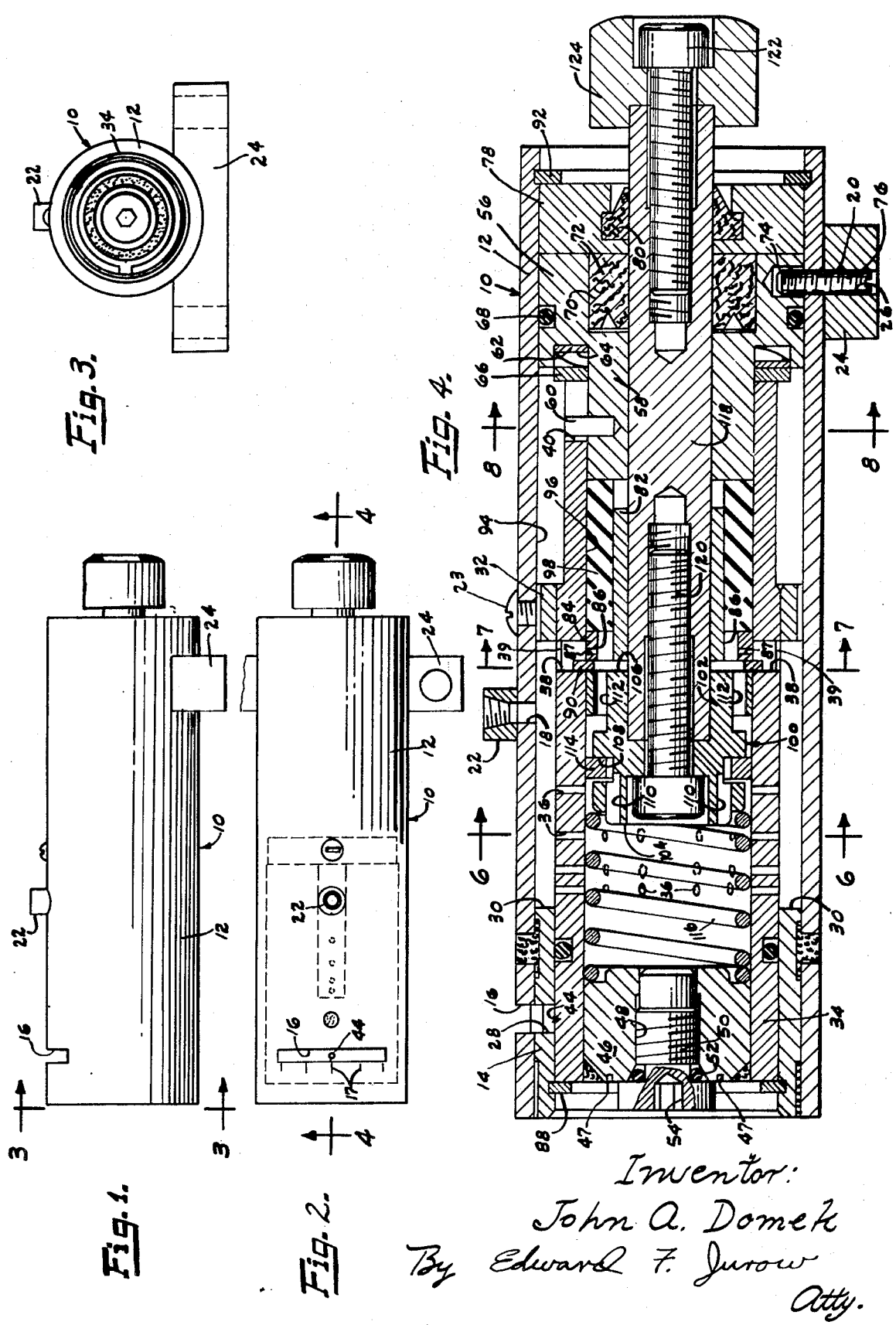

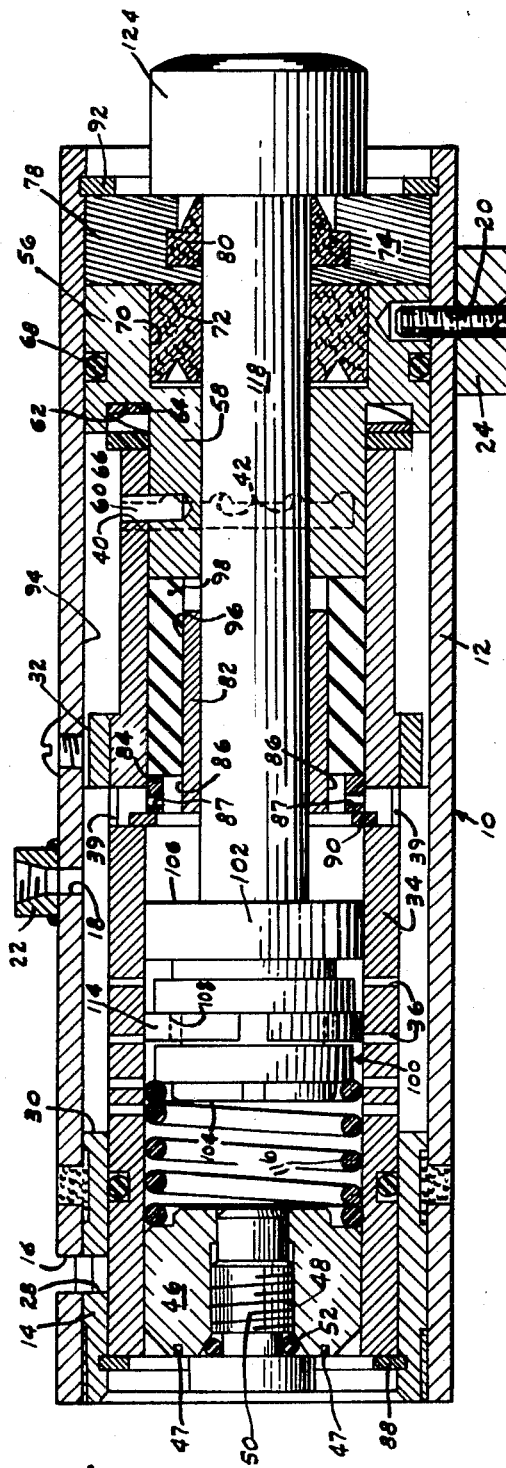

ADJUSTABLE SHOCK ABSORBER

BACKGROUND OF THE INVENTION

1. Field of the Invention

The present invention pertains generally to a hydraulic shock absorber, which is adapted for use, for example, in aircraft, automotive, machine and railroad applications, and which is capable of being adjusted to decelerate loads of differing kinetic quantities.

2. Description of the Prior Art

One type of hydraulic shock absorber comprises a chamber, sometimes defined by a pressure tube, which is filled with fluid and has slidably mounted therein a piston arranged to receive impact forces. Usually, the shock absorber is provided with metering orifice means for the chamber through which fluid is forced when the shock absorber is under load, and, heretofore, various forms of orifice regulating means have been associated with the metering orifice means for adjusting the operational characteristics of the shock absorber. However, such prior constructions have not been as efficient in operation, as readily adjustable, as compact in arrangement, and as economical to manufacture, as might be desired.

SUMMARY OF THE INVENTION

The present invention is concerned with a hydraulic shock absorber comprising a casing with fluid passageway means and fluid reservoir chamber means therein, a pressure tube within the casing and having metering ports of various sizes in the wall thereof, a piston assembly axially movable within the pressure tube, and a piston rod connected to the piston assembly and extending outwardly of the casing for receiving impact forces. As the piston assembly moves through the pressure tube under an impact force, fluid is forced outwardly of the pressure tube through those metering ports which are aligned with the fluid passageway means. The pressure tube is rotatable relative to the casing whereby different ones of the metering ports may be selectively aligned with the fluid passageway means. By thus changing the ports which are aligned with the fluid passageway means, the effective metering area may be altered for adjusting the operating characteristics of the shock absorber. Other advantages and features of the present invention will become apparent from the following detailed description.

BRIEF DESCRIPTION OF THE DRAWINGS

FIG. 1 is a side elevational view of the hydraulic shock absorber of the present invention;

FIG. 2 is a plan view of the shock absorber of FIG. 1;

FIG. 3 is an end view of the shock absorber of FIG. 1, taken substantially along the line 3—3 in FIG. 1, looking in the direction indicated by the arrows;

FIG. 4 is an enlarged longitudinal sectional view, taken substantially along the line 4—4 in FIG. 2, looking in the direction indicated by the arrows;

FIG. 5 is a longitudinal sectional view corresponding generally to FIG. 4, but showing the shock absorber under load;

FIG. 6 is a transverse sectional view, taken substantially along the line 6—6 in FIG. 4, looking in the direction indicated by the arrows;

FIG. 7 is a transverse sectional view, taken substantially along the line 7—7 in FIG. 4, looking in the direction indicated by the arrows; and FIG. 8 is a transverse sectional view, taken substantially along the line 8—8 in FIG. 4, looking in the direction indicated by the arrows.

DESCRIPTION OF THE PREFERRED EMBODIMENT

As shown in FIGS. 1–4, the hydraulic shock absorber of the present invention includes a casing 10, which is comprised of an outer cylindrical tube 12 and an intermediate cylindrical tube 14 secured together by brazing or the like. The outer tube 12 is provided with an arcuate slot 16 adjacent the rear end thereof along which extend circumferentially etched graduations or indicia 17, an aperture 18 intermediate of the ends thereof, and an aperture 20 adjacent the forward end thereof. A connector fitting 22 is secured to the outer tube 12 at the aperture 18, while a mounting strap 24 is secured to the tube 12 with a threaded aperture 26 aligned with the tube aperture 20. The intermediate tube 14 is provided with an arcuate slot 28 which is aligned with the arcuate slot 16, a pair of diametrically opposed longitudinal slots 30, and an annular recess 32. The slots 30 and recess 32 serve to define fluid passageway means within the casing 10.

Rotatably mounted within the intermediate tube 14 is a cylindrical pressure tube 34 which is formed with a plurality of axially spaced corresponding series of circumferentially spaced ports or orifices 36. As shown in FIGS. 4 and 6, the ports 36 in each circumferential series are of various diameters with the diametrically opposed ports being of the same diameter, the longitudinally corresponding ports 36 of the several series are of uniform size, and each series of ports 36 are arranged in planes spaced-apart exponentially. Additionally, the pressure tube 34 is formed with diametrically opposed apertures 38 and a circumferential channel 39 (FIGS. 4 and 7), and an arcuate indexing slot 40 (FIGS. 5 and 8) having circumferentially spaced detent notches 42 along one side thereof. Also, the pressure tube 34 is provided with a reference mark 44 (FIGS. 2 and 4) which is visible through the arcuate slots 16 and 28 for indexing purposes.

Suitably secured in the rearward end of the pressure tube 34 is a closure member 46 having spanner holes 47 and a central threaded filler opening 48 in which is disposed plug 50. A suitable O-ring seal 52 is provided about the body of the plug 50, and a central axial socket 54 is provided in the head of the plug 50. Mounted at the forward end of the outer tube 12 is a gland member 56 having a rear end section 58 of reduced diameter which serves to support the forward end of the pressure tube 34. Secured in the gland section 58 is a radial indexing pin member 60 which projects into the indexing slot 40 of the pressure tube 34. The gland member 56 is also formed with a rearwardly facing annular recess 62 in which is located annular corrugated wave spring means 64 that bears against a washer 66 at the forward end of the pressure tube 34 for restraining movement of the latter from any preselected rotational position. Still further, the gland member 56 has mounted in the outer periphery thereof an O-ring seal 68 for sealing engagement with the inner periphery of the outer tube 12, and is formed with an inner annular recess 70 in which is mounted a piston rod seal 72. Also, the gland member 56 is formed with a blind aperture 74; and a screw 76, which is threaded through the apertures 26 and 20, projects into the gland aperture 74 for properly locating the gland member 56 and the indexing pin member 60. A gland retainer 78, which provides support for a piston rod wiper 80, is mounted at the forward end of the gland member 56.

Mounted within the pressure tube 34, immediately rearwardly of the gland section 58 is a spacer sleeve 82 having a rear flange portion 84 in which are provided four circumferentially spaced-apart axial holes 86 and radial holes 87. The various components of the hydraulic shock absorber are maintained in assembled position by means of a rear snap ring 88, an intermediate snap ring 90 and a front snap ring 92. An annular fluid reservoir chamber 94 is defined by the outer tube 12 and the pressure tube 34, and communicates with the annular recess 32 of the intermediate tube 14; and an annular fluid reservoir chamber 96 is defined intermediate of the pressure tube 34 and the spacer sleeve 82, and communicates through the spacer holes 86 and 87 and the pressure tube apertures 38 with the longitudinal slots 30 in the intermediate tube 14. An annular cellular member 98, which may be fabricated of rubber or the like, is disposed in the chamber 96.

Mounted for axial movement within the pressure tube 34 is a piston assembly 100 which includes a piston 102 having a rearward section of reduced diameter, and presenting a rearward side 104 and a forward side 106. The piston 102 is formed with an intermediate annular groove 108 which communicates with axial ports 110 opening at the rearward side 104, and with axial ports 112 opening at the forward side 106. Arranged within the piston groove 108 is a floating piston ring 114 which is narrower than the width of the groove 108. The piston assembly 100 is spring biased forwardly by means of a coil spring 116 arranged between the closure member 46 and the piston 102.

A piston rod 118, at its inner end, is secured in the piston 102, as by a cap screw 120, and extends from the forward side 106 thereof outwardly of the casing 10 for receiving impact forces. The piston rod 118 is slidably guided and supported in the spacer sleeve 82 and the gland section 58, and is suitably sealed by the piston rod seal 72 and the piston rod wiper 80. In this connection, the snap ring 90 serves to prevent the piston and rod assembly from being ejected when the gland member 56 and retainer 78 are removed for seal replacement. The outer end of the piston rod 118 has secured thereon, by means of a cap screw 122, a bumper cap 124 which serves to protect the end of the piston rod 118 from repeated blows that would otherwise tend to upset the end. To make the shock absorber operational, the plug 50 is removed and suitable hydraulic fluid is introduced through the filler and opening 48.

In the operation of the hydraulic shock absorber, impact forces received by the piston rod 118 cause the latter and the piston assembly 100 to move rearwardly within the pressure tube 34 from the position shown in FIG. 4 toward the position shown in FIG. 5. As rearward movement of the piston assembly 100 commences, pressure initially built up in the hydraulic fluid within the pressure tube 34 causes the floating piston ring 114 to be forced into abutment with the forward side of the annular groove 108 thereby preventing hydraulic fluid from flowing past the piston 102. During rearward movement of the piston assembly 100, the hydraulic fluid is forced outwardly of the pressure tube 34 through the metering ports 36 which are aligned with the longitudinal slots 30. By metering the displacement of hydraulic fluid from the pressure tube 34 in the manner described, high-energy absorption or dissipation characteristics are attained. Fluid flowing from the ports 36 is transmitted along the slots 30, through the annular recess 32, the apertures 38 and the holes 87 and 86, and to the forward side of the piston assembly 100 and into the annular chambers 94 and 96. In this connection, the cellular member 98, which serves as an accumulator, accommodates the fluid displaced by the piston rod 118, thereby permitting the hydraulic shock absorber to be completely filled with hydraulic fluid and to be mounted and operated at any attitude.

As the piston assembly 100 moves past and closes off successive metering ports 36, there is a reduction in the number of ports communicating with the passageway slots 30, and hence in the total effective metering area of the ports, through which hydraulic fluid can be displaced from the pressure tube 34. Because the ports 36 in longitudinal alignment with the passageway slots 30 are of a uniform diameter and are spaced apart exponentially, the total effective metering area decreases exponentially with the stroke of the piston. Therefore, the shock absorber provides a uniform stopping force as well as a uniform rate of deceleration throughout the stroke.

When the impact forces are removed from the bumper cap 124, the spring 116 serves to return the piston assembly 100 to the normal rest position shown in FIG. 4. During such forward return motion of the piston assembly 100, the floating piston ring 114 moves away from the forward side of the annular groove 108 thereby permitting the free flow of hydraulic fluid through the piston assembly 100. At the same time, hydraulic fluid in the pressure tube 34 on the forward side of the piston assembly 100 is permitted to flow outwardly thereof through the holes 86 and 87 and apertures 38.

When a load with a different kinetic energy is to be absorbed, a suitable implement, such as a spanner wrench, is inserted in the spanner holes 47, and the pressure tube 34 is urged axially forwardly to move the engaged detent notch 42 away from the indexing pins 60. Then the pressure tube 34 is manually rotated whereby corresponding metering ports 36 of a different size may be selectively aligned with the passageway slots 30. In this connection, the reference mark 44, which is visibly alignable with the indicia 17, serves as a setting indicator to indicate the rotative position of pressure tube 34. Upon release of axial pressure on the pressure tube 34, the wave spring 64 returns the pressure tube to the normal position shown in FIG. 4 and engages the adjacent detent notch 42 with the indexing pin 60. Thus, the detented indexing slot 40 and the cooperating indexing pin 60 serve to locate the pressure tube 34 in any preselected rotative or metering pattern position, while the wave spring 64 serves to releasably maintain the pressure tube in the preselected position. The washer 66 is provided to compensate for wave spring discontinuity. In the manner described, the effective metering area of the ports 36 may be easily and accurately adjusted. Because the diametrically opposed and longitudinally corresponding metering ports 36 of the several series are of uniform size, changes in effective metering area are effected uniformly. Therefore, in all normal operating positions of the pressure tube 34, the total effective metering area will always decrease exponentially with the stroke of the piston assembly 100.

As will be appreciated, the length of the longitudinal slots 30 is proportional to the stroke of the piston assembly 100, and the number of slots 30 may be increased or decreased in accordance with the mass velocity relationship of the impacting system. When the impact mass is high and the velocity is low, one longitudinal slot 30 will suffice, and, in this case, metering ports 36 need be provided in only one-half of the circumference of the pressure tube 34. Also, the arcuate length of the detented indexing slot 40 may be increased or decreased in accordance with the metering pattern established by the circumferential number and location of the metering ports 36. To allow for additional excessive fluid expansion within the shock absorber, the annular chamber 94 may have disposed therein a cellular member similar to member 98. Finally, the connector fitting 22 permits the shock absorber to be used in conjunction with an external reservoir. When use with an external reservoir is not contemplated, a plug may be threaded in the fitting 22, or the fitting 22 and casing aperture 18 may be eliminated entirely.

While there has been shown and described what is believed to be a preferred embodiment of the present invention, it will be understood by those skilled in the art that various rearrangements and modifications may be made therein without departing from the spirit and scope of the invention.

I claim:
1. A shock absorber comprising a casing having fluid passageway means therein, a pressure tube within said casing, a piston assembly axially movable within said pressure tube and presenting forward and rearward sides, a piston rod connected to said piston assembly and extending from the forward side thereof outwardly of said casing for receiving impact forces, said pressure tube having a plurality of ports of various diameters in the wall thereof at least one of which is aligned with said fluid passageway means for metering the flow of fluid outwardly of said pressure tube to said fluid passageway means as said piston assembly moves rearwardly in said pressure tube, said plurality of ports being comprised of a plurality of axially exponentially spaced-apart corresponding series of circumferentially spaced-apart ports of various diameters with the diametrically opposed ports in each series of ports being of the same diameter, said fluid passageway means being comprised of a pair of diametrically opposed longitudinal slots formed in said casing, said pressure tube being rotatable relative to said casing whereby other of said ports of a different diameter than said one port may be selectively aligned with said fluid passageway means for altering the effective metering area between said pressure tube and said fluid passageway means, said pressure tube being formed with an arcuate indexing slot having detent notches in the side thereof; fluid reservoir means in said casing and having communication with said fluid passageway means, a stationary indexing pin in said casing and projecting into said arcuate indexing slot for engagement by one of said detent notches to thereby locate said pressure tube in any preselected rotative position, and spring means within said casing and engaging said pressure tube for releasably maintaining any preselected detent notch in engagement with said indexing pin.

2. A shock absorber comprising a generally cylindrical casing having at least one longitudinally extending fluid passageway means formed on the inner surface thereof, a pressure tube within said casing, a piston assembly axially movable within said pressure tube and presenting forward and rearward sides, a piston rod connected to said piston assembly and extending from the forward side thereof outwardly of said casing for receiving impact forces, said pressure tube having at least two circumferentially spaced sets of ports formed therein with each of said sets being characterized by a plurality of axially spaced ports of the same diameter and with the port diameter of each set being different from the port diameter of the next adjacent set, said pressure tube being rotatable relative to said casing between predetermined positions whereby each set of said ports may be selectively aligned with said fluid passageway means for altering the effective metering area between said pressure tube and said fluid passageway means as said piston assembly moves rearwardly in said pressure tube, pin-and-detent means provided between said casing and said pressure tube for positively positioning each of said sets of ports in alignment with said fluid passageway means, and releasable retaining means for said pin-and-detent means.

3. The shock absorber of claim 2 wherein said casing is formed with an arcuate slot having indicia means provided therealong, and said pressure tube is provided with a reference mark visible through said arcuate slot and alignable with said indicia means to indicate the rotative position of said pressure tube.

4. The shock absorber of claim 2 wherein said pressure tube is formed with an arcuate indexing slot having detent notches in the side thereof, and including a stationary indexing pin in said casing and projecting into said arcuate indexing slot for engagement by one of said detent notches to thereby locate said pressure tube in any preselected rotative position.

5. The shock absorber of claim 4 including a gland member secured in said casing, and spring means intermediate said gland member and said pressure tube for releasably maintaining any preselected detent notch in engagement with said indexing pin.

* * * * *